(12) United States Patent
Gottschalk

(10) Patent No.: US 8,641,062 B2
(45) Date of Patent: Feb. 4, 2014

(54) LIFT AXLE SUSPENSION SYSTEMS INCORPORATING COMPRESSION COIL SPRINGS

(75) Inventor: Michael J. Gottschalk, Newark, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 13/269,103

(22) Filed: Oct. 7, 2011

(65) Prior Publication Data

US 2013/0087984 A1  Apr. 11, 2013

(51) Int. Cl.
*B62D 61/12* (2006.01)
(52) U.S. Cl.
USPC ............ 280/86.5; 280/124.116; 280/124.128; 280/124.134; 280/124.141; 180/24.02
(58) Field of Classification Search
USPC ................. 280/86.5, 89.12, 124.11, 124.135, 280/124.136, 124.141, 124.134, 43, 43.17, 280/124.153, 124.148, 124.151, 124.131, 280/124.128; 180/24.02, 209
See application file for complete search history.

(56) References Cited

U.S. PATENT DOCUMENTS

| | | | |
|---|---|---|---|
| 2,074,103 A | * | 3/1937 | Chryst ........................ 267/222 |
| 2,279,154 A | | 4/1942 | Wood |
| 2,510,037 A | | 5/1950 | Quayle |
| 3,093,388 A | | 6/1963 | Kulyk |
| 3,285,621 A | | 11/1966 | Turner, Jr. |
| 3,486,763 A | | 12/1969 | Hexel |
| 3,730,549 A | | 5/1973 | Turner, Jr. |
| 3,751,066 A | | 8/1973 | Narahari |
| 3,771,812 A | | 11/1973 | Pierce et al. |
| 3,870,336 A | | 3/1975 | Bilas |
| 3,960,389 A | | 6/1976 | Narahari |
| 3,966,223 A | | 6/1976 | Carr |
| 4,166,639 A | | 9/1979 | Taylor |
| 4,293,145 A | | 10/1981 | Taylor |
| 4,373,738 A | | 2/1983 | Lange |
| 4,497,507 A | | 2/1985 | Chervenak |
| 4,504,080 A | | 3/1985 | VanDenberg |
| 4,573,704 A | | 3/1986 | VanDenberg |
| 4,623,165 A | | 11/1986 | Timmers |
| 4,634,141 A | | 1/1987 | Hagan et al. |
| RE32,486 E | | 9/1987 | Raidel, Jr. |
| 4,700,968 A | | 10/1987 | Cherry |

(Continued)

FOREIGN PATENT DOCUMENTS

| | | |
|---|---|---|
| WO | WO 9528312 A2 * | 10/1995 |
| WO | WO 98/14360 A1 | 4/1998 |
| WO | WO 02/083486 A1 | 10/2002 |

*Primary Examiner* — James English
(74) *Attorney, Agent, or Firm* — Cook Alex Ltd.

(57) ABSTRACT

A lift axle suspension system is provided with a frame bracket member connectable to a vehicle frame, an upper control arm, and a lower control arm. Each control arm has a first end and a second end, with the first end of each control arm being pivotally connected to the frame bracket member. The suspension system also includes an axle connecting member connectable to an axle, with the second end of each control arm being pivotally connected to the axle connecting member. A compression coil spring having a first end connected to the lower control arm and a second end connected to the upper control arm serves as a lift mechanism for lifting and lowering the axle connected to the axle connecting member. The compression coil spring may encircle at least a portion of and be substantially coaxial with the lower control arm.

20 Claims, 7 Drawing Sheets

(56) References Cited

U.S. PATENT DOCUMENTS

| | | | | |
|---|---|---|---|---|
| 4,711,464 | A | 12/1987 | Bilas | |
| 4,729,579 | A | 3/1988 | Hagan et al. | |
| 4,770,430 | A * | 9/1988 | Lange | 280/81.6 |
| 4,792,148 | A * | 12/1988 | Hintz | 280/149.1 |
| 4,805,710 | A * | 2/1989 | Jarl et al. | 180/24.02 |
| 4,823,896 | A | 4/1989 | Evans et al. | |
| 4,854,409 | A | 8/1989 | Hillebrand et al. | |
| 5,018,756 | A * | 5/1991 | Mitchell | 280/81.6 |
| 5,230,528 | A | 7/1993 | Van Raden et al. | |
| 5,403,031 | A | 4/1995 | Gottschalk et al. | |
| 5,505,482 | A | 4/1996 | VanDenberg | |
| 5,588,665 | A | 12/1996 | Pierce et al. | |
| 5,630,625 | A | 5/1997 | Shaw | |
| 5,778,798 | A | 7/1998 | VanDenberg | |
| 5,853,183 | A | 12/1998 | VanDenberg | |
| 5,868,418 | A | 2/1999 | VanDenberg | |
| 5,915,705 | A | 6/1999 | VanDenberg | |
| 5,961,135 | A * | 10/1999 | Smock | 280/124.11 |
| 6,003,885 | A | 12/1999 | Richardson | |
| 6,007,078 | A * | 12/1999 | Gottschalk et al. | 280/86.751 |
| 6,062,578 | A * | 5/2000 | Richardson | 280/81.6 |
| 6,073,946 | A * | 6/2000 | Richardson | 280/86.5 |
| 6,416,069 | B1 * | 7/2002 | Ramsey | 280/124.116 |
| 6,581,711 | B1 * | 6/2003 | Tuluie | 180/227 |
| 6,752,406 | B2 | 6/2004 | Pierce et al. | |
| 6,796,566 | B2 * | 9/2004 | VanDenberg | 280/86.5 |
| 6,880,839 | B2 | 4/2005 | Keeler et al. | |
| 6,883,813 | B2 | 4/2005 | Gottschalk | |
| 7,360,773 | B2 * | 4/2008 | Gottschalk | 280/86.5 |
| 7,434,821 | B2 * | 10/2008 | Hinz | 280/86.5 |
| 7,748,724 | B2 * | 7/2010 | Gottschalk | 280/86.5 |
| 7,766,349 | B2 * | 8/2010 | Gottschalk | 280/86.5 |
| 7,854,436 | B2 * | 12/2010 | Hock et al. | 280/86.5 |
| 7,980,571 | B2 * | 7/2011 | Chalin et al. | 280/86.5 |
| 2007/0222169 | A1 | 9/2007 | Smith et al. | |

* cited by examiner

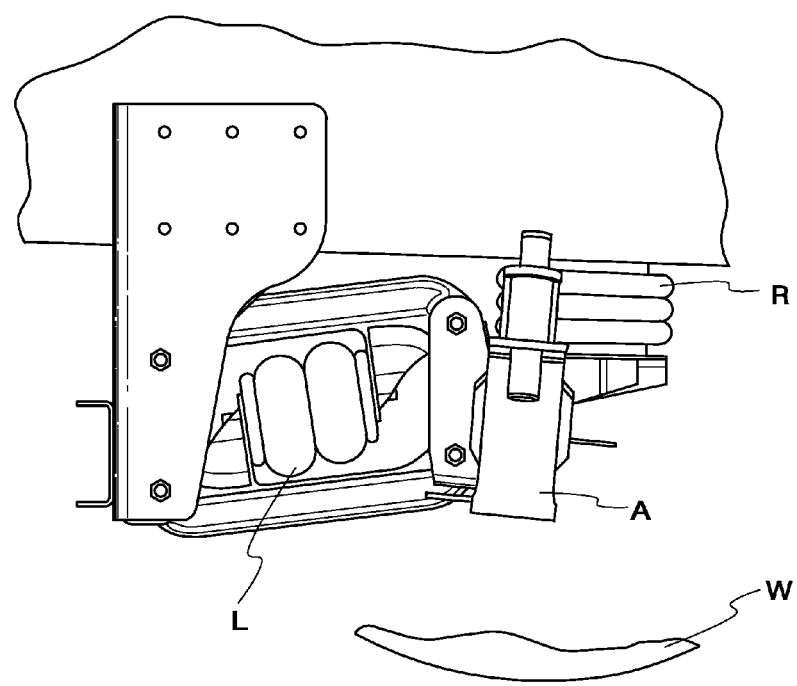
*Fig. 1*
*Prior Art*
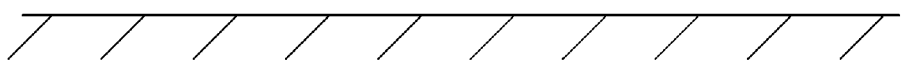

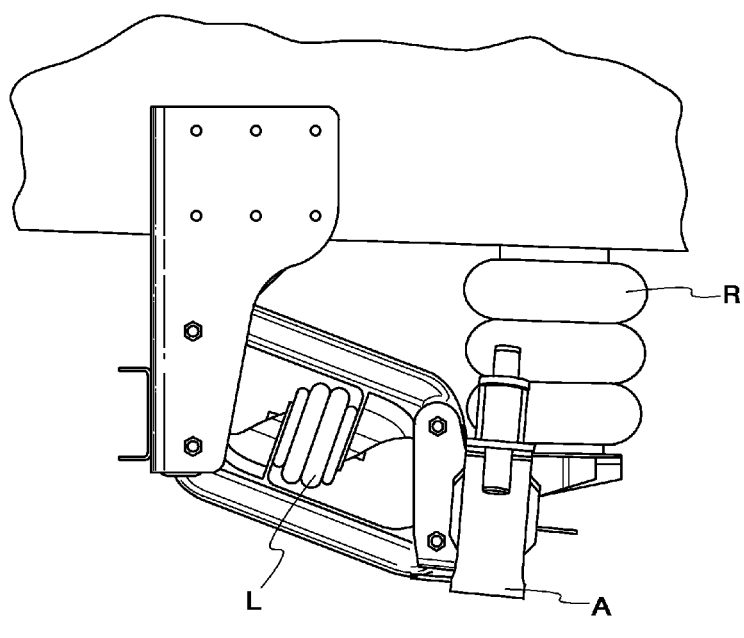
Fig. 2
Prior Art
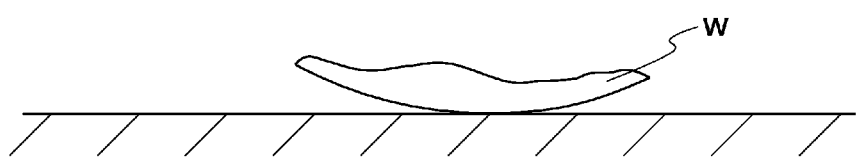

LIFT AXLE SUSPENSION SYSTEMS INCORPORATING COMPRESSION COIL SPRINGS

BACKGROUND

1. Field of the Disclosure

This disclosure relates to auxiliary lift axle suspension systems for wheeled vehicles such as heavy duty dump trucks and trailers. More particularly, this disclosure relates to auxiliary lift axle suspension systems employing means other than inflatable bellows for selectively lowering and lifting the wheel bearing auxiliary axle of a vehicle into and out of road engagement.

2. Description of Related Art

Certain vehicles, such as heavy duty dump trucks, semi-trailers and the like, employ at least one designated wheel bearing axle suspension system capable of being raised and lowered selectively into and out of load bearing engagement with the road surface. The need to selectively lift and lower the axle usually arises in order for the vehicle to comply with maximum highway weight limit laws, though there may also be other reasons for lifting or lowering the axle (e.g., lifting the axle when traveling off-road or lowering the axle to provide an additional measure of safety when the vehicle is being loaded). These maximum weight limit laws are intended to prevent damage to roadways, particularly bridges, so they are often referred to as "bridge laws." These bridge laws often mandate, not just a maximum vehicle weight, but further prescribe (e.g., as by the so-called "bridge formula") that the required number of axles be spaced in such a manner so as to distribute the weight of the vehicle and its cargo over a selected length of the vehicle. The extra axles used to decrease the weight supported by each axle and their associated suspension systems are often referred to as "auxiliary" axle suspension systems. The ability to lawfully carry a greater amount of cargo often translates into increased profits and a more economically efficient use of the vehicle, so many efforts have been made to provide the most advantageous auxiliary axles.

One type of auxiliary axle which has been successfully employed incorporates a "parallelogram" lift axle suspension system. Systems of this type are described in greater detail in a variety of patent publications, including U.S. Pat. No. 5,403,031 to Gottschalk et al. and U.S. Pat. No. 6,880,839 to Keeler et al., both of which are incorporated herein by reference. Further examples of lift axle suspension systems of this type may be found in the products commercialized by Hendrickson USA, L.L.C. of Itasca, Ill.

Known lift axle suspension systems of this type typically employ a plurality of inflatable bellows, with one oriented substantially vertically and another oriented generally horizontally, as shown in FIGS. 1 and 2. The vertical bellows, which is generally indicated at R, is often referred to as the "ride spring" or "ride bellows," while the horizontal bellows, which is generally indicated at L, is often referred to as the "lift spring" or "lift bellows." FIG. 1 shows the ride bellows R deflated and the lift bellows L inflated, which raises the associated axle A and wheel W out of contact with the ground. FIG. 2 shows the ride bellows R inflated and the lift bellows L deflated, which brings the axle A to a lower vertical position and places the associated wheel W in contact with the ground.

While lift systems of the type illustrated in FIGS. 1 and 2 have proven to be suitable, it may be advantageous to provide a lift axle suspension system which employs a different lift mechanism. For example, it is possible for the lift bellows L to become punctured or damaged, which may prevent it from properly inflating and lifting the tire of the auxiliary axle off of the ground. Further an inflatable bellows may be relatively large and expensive and, when used in combination with an inflatable ride bellows, may increase the complexity of the associated air controls. Accordingly, it may be advantageous to provide a lift mechanism which does not rely on an inflatable lift bellows.

Additionally, if the lift bellows L becomes damaged, it is possible that debris could become expelled onto the roadway, possibly damaging the associated vehicle or another vehicle on the roadway. Accordingly, it may be advantageous to provide a lift mechanism which is mounted to the associated lift axle suspension system or otherwise configured in a way that prevents the release of debris upon damage to the lift mechanism.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect of the present disclosure, a lift axle suspension system is provided with a frame bracket member connectable to a vehicle frame, an upper control arm, and a lower control arm. Each control arm has a first end and a second end, with the first end of each control arm being pivotally connected to the frame bracket member. The lift axle suspension system further includes an axle connecting member connectable to an axle, with the second end of each control arm being pivotally connected to the axle connecting member. A compression coil spring is provided with a first end thereof connected to the lower control arm and a second end thereof connected to the upper control arm. The upper control arm includes a generally radially extending plate member, with a portion of the plate member being configured to move along the lower control arm. A second end of the compression coil spring is connected to the plate member.

In another aspect of the present disclosure, a lift axle suspension system is provided with a frame bracket member connectable to a vehicle frame, an upper control arm, and a lower control arm. Each control arm has a first end and a second end, with the first end of each control arm being pivotally connected to the frame bracket member. The lift axle suspension system further includes an axle connecting member connectable to an axle, with the second end of each control arm being pivotally connected to the axle connecting member. A lift mechanism is provided with a first end thereof connected to the lower control arm and a second end thereof connected to the upper control arm. The lift mechanism is substantially coaxial with one of the control arms.

In another aspect of the present disclosure, a lift axle suspension system is provided with a frame bracket member connectable to a vehicle frame, an upper control arm, and a lower control arm. Each control arm has a first end and a second end, with the first end of each control arm being pivotally connected to the frame bracket member. The lift axle suspension system further includes an axle connecting member connectable to an axle, with the second end of each control arm being pivotally connected to the axle connecting member. A lift mechanism is provided with a first end thereof connected to the lower control arm and a second end thereof connected to the upper control arm. The lift mechanism encircles at least a portion of one of the control arms.

BRIEF DESCRIPTION OF THE DRAWINGS

In the following detailed description, reference will frequently be made to the following views of the drawing, in which like reference numerals refer to like components, and in which:

FIG. 1 is a side elevational view of a lift axle suspension system according to a known design, with the axle in a lowered position;

FIG. 2 is a side elevational view of the lift axle suspension system of FIG. 1, with the axle in a lifted position;

DESCRIPTION OF THE ILLUSTRATED EMBODIMENTS

The embodiments disclosed herein are for the purpose of providing the required description of the present subject matter. These embodiments are only exemplary. Specific details disclosed herein are not to be interpreted as limiting the subject matter as defined in the accompanying claims, unless such details are expressly recited in the claims.

Figure 3:
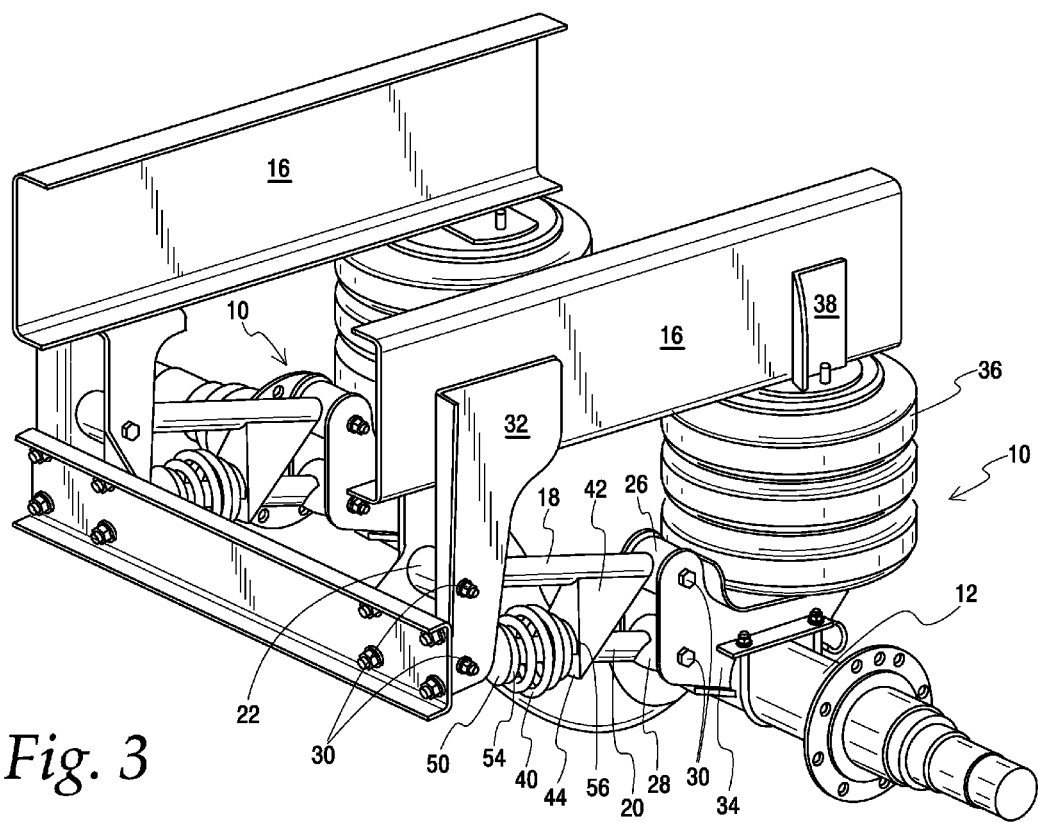
FIG. 3 is a front perspective view of a lift axle suspension system according to an aspect of the present disclosure, with the suspension system employed in combination with a rigid axle.
Figure 4:
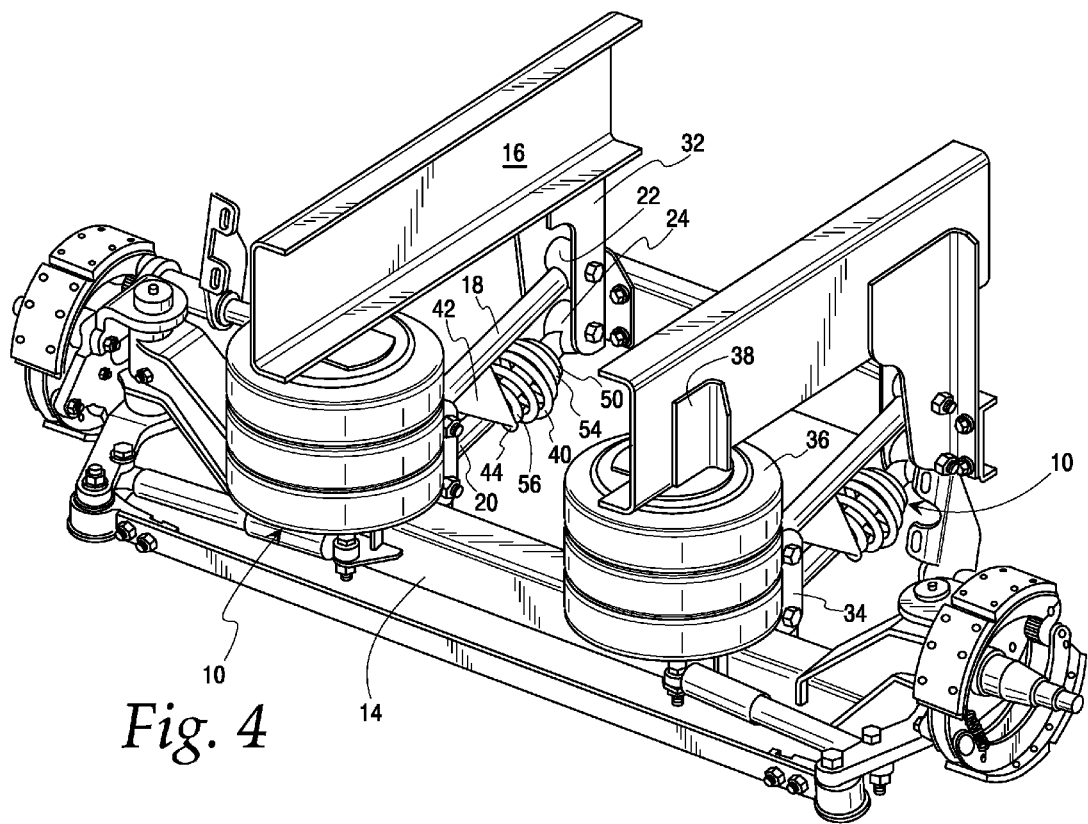
FIG. 4 is a rear perspective view of a lift axle suspension system according to an aspect of the present disclosure, with the suspension system employed in combination with a passive steer axle.

FIGS. 3 and 4 illustrate alternative applications for lift axle suspension systems 10 according to the present disclosure. In the embodiment of FIG. 3, the lift axle suspension system 10 is incorporated into a rigid or non-steerable auxiliary axle 12. In the embodiment of FIG. 4, the lift axle suspension system 10 is incorporated into a passive steer auxiliary axle 14. In each embodiment, the vehicle frame, axle, and associated axle and steering components may be according to conventional design and will not be discussed herein in great detail. The discussion which follows will focus on the embodiment of FIG. 4 but, as there are only minor differences between the two embodiments (e.g., the particular shape of the member used to connect the lift axle suspension system to the axle 12, 14), the following description is equally applicable to the embodiment of FIG. 3. Additionally, while FIGS. 3 and 4 illustrate two possible embodiments of lift axle suspension systems according to the present disclosure, other variations and embodiments are also possible, so the illustrated embodiments should not be considered exclusive or limiting.

For each auxiliary axle 14, a pair of lift axle suspension systems 10 are provided, with one lift axle suspension system 10 attached to each left and right side longitudinal frame rail 16 of the vehicle frame and the axle 14 extending therebetween. The lift axle suspension systems 10 cooperate to move the associated axle 14 between a lowered position (FIG. 5) and a lifted or raised position (FIG. 7), with any number of intermediate positions (one of which is illustrated in FIG. 6) therebetween. Typically, the lift axle suspension system 10 move the associated axle 14 between the lowered and lifted positions smoothly, so it should be understood that FIG. 6 is a snapshot of the axle 14 being moved from one final position to another and does not represent a position at which the axle 14 is maintained for any significant amount of time. As the left and right lift axle suspension systems 10 are identical, only the left side lift axle suspension system 10 will be described herein, but it should be understood that the description of the left side lift axle suspension system 10 applies equally to the right side lift axle suspension system 10.

In the illustrated embodiment, the lift axle suspension system 10 includes an upper control arm 18 and a lower control arm 20. Both the upper and lower control arms 18 and 20 include a first end (respectively identified as 22 and 24) and a second end (respectively identified as 26 and 28). The first ends 22 and 24 are best seen in FIG. 4, while the second ends 26 and 28 are best seen in FIG. 3. The first ends 22 and 24 of the control arms 18 and 20 are pivotally connected (e.g., with mechanical fasteners 30 such as bolts or pins) to a frame bracket member 32. The frame bracket member 32 may be variously configured, provided that it is suitable for being secured to the vehicle frame 16 and presents a suitable surface for pivotally connecting the first ends 22 and 24 of the control arms 18 and 20. The frame bracket member 32 of FIG. 4 is illustrated as a component having at least one laterally facing surface to which the control arms 18 and 20 may be pivotally connected. In the illustrated embodiment, the frame bracket member 32 includes a pair of laterally spaced, laterally facing surfaces which define a channel or gap that receives the first ends 22 and 24 of the control arms 18 and 20, with the mechanical fasteners 30 extending from one side of the channel to the other to hold the first ends 22 and 24 of the control arms 18 and 20 in place.

The other ends 26 and 28 of the control arms 18 and 20 are pivotally connected (e.g., with mechanical fasteners 30 such as bolts or pins) to an axle connecting member 34. The axle connecting member 34 may be variously configured, provided that it is suitable for being secured to the axle 14 and presents a suitable surface for pivotally connecting the second ends 26 and 28 of the control arms 18 and 20. The axle connecting member 34 of FIG. 4 is illustrated as a component having at least one laterally facing surface to which the control arms 18 and 20 may be pivotally connected. In the illustrated embodiment, the axle connecting member 34 includes a pair of laterally spaced, laterally facing surfaces which define a channel or gap that receives the second ends 26 and 28 of the control arms 18 and 20 (which is not visible in FIG. 4, but can be seen in FIG. 3), with the mechanical fasteners 30 extending from one side of the channel to the other to hold the second ends 26 and 28 of the control arms 18 and 20 in place.

The axle 14 is connected to the vehicle frame 16 by an inflatable ride bellows 36, which has a bottom end connected to the top of the axle 14 (or may be seated upon a portion of the axle connecting member 34) and a top end secured to the vehicle frame 16 by an upper end plate 38. The ride bellows 36 and the piping and controls therefore may be provided according to conventional design and functionality.

Figure 5:
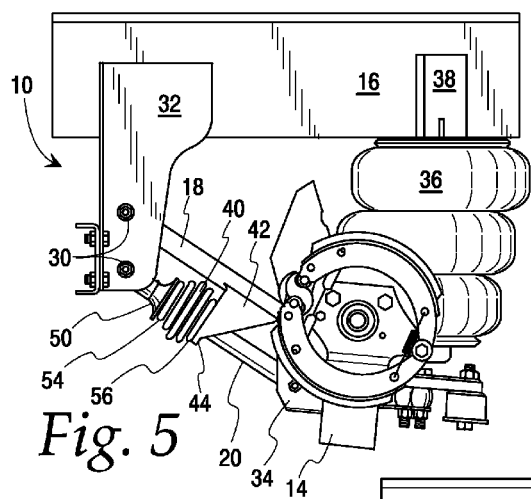
FIG. 5 is a side elevational view of the lift axle suspension system of FIG. 4, with the axle in a lowered position.
Figure 6:
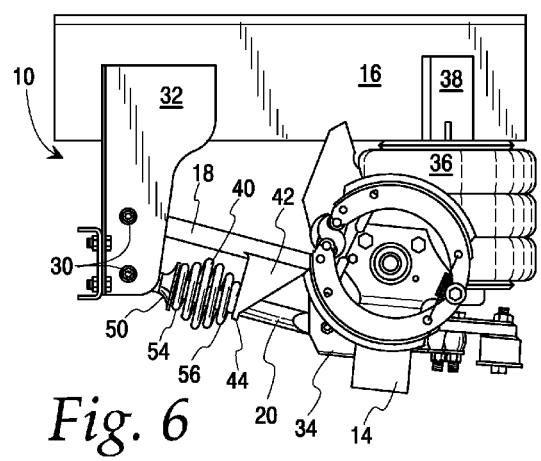
FIG. 6 is a side elevational view of the lift axle suspension system of FIG. 4, with the axle in an intermediate position.
Figure 7:
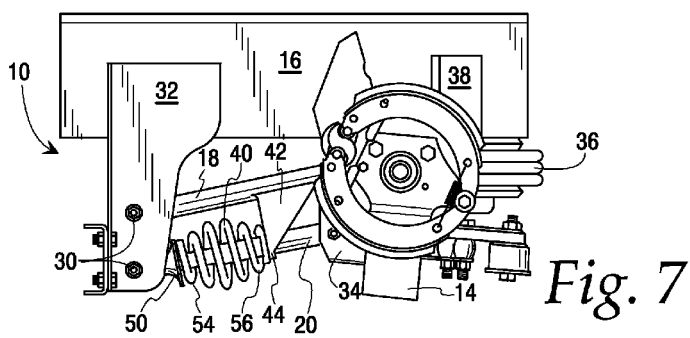
FIG. 7 is a side elevational view of the lift axle suspension system of FIG. 4, with the axle in a lifted position.

FIGS. 5-7 show the condition of the ride bellows 36 during various stages of lifting and lowering the axle 14. When, as shown in FIG. 5, the ride bellows 36 is inflated (by operation of the aforesaid conventional controls), the axle 14 is in a lowered position in which its wheels (not illustrated) are forced downwardly into contact with the ground by the expansion of the ride bellows 36. When the axle 14 is in the process of being raised or lowered, it will be in an intermediate position (FIG. 6) in which the ride bellows 36 is partially inflated. Finally, when the axle 14 is in a fully lifted or raised position (FIG. 7), the ride bellows 36 is completely (or at least substantially) deflated. A lift mechanism 40 associated with one of the control arms serves to lift the axle 14, as will be described in greater detail below.

Turning back now to the control arms 18 and 20, the upper control arm 18 includes a generally radially extending plate member 42. The plate member 42 may be integrally formed with the upper control arm 18 or otherwise provided as a separate element which is secured to the upper control arm 18 (e.g., by welding). The lower or outer end 44 of the plate member 42 is configured to accommodate the lower control arm 20. In one embodiment, the lower end 44 is split or forked to accommodate the lower control arm 20, although other configurations may also be employed without departing from the scope of the present disclosure. As will be described in greater detail below, the lower end 44 of the plate member 42 serves as a contact point for the lift mechanism 40 associated with the lower control arm 20, with the lift mechanism 40 being substantially coaxial with the lower control arm 20. The forked end 44 of the plate member 42 allows it to provide a suitable contact point, while also allowing the control arms 18 and 20 to pivot without interfering with each other.

Figure 8:
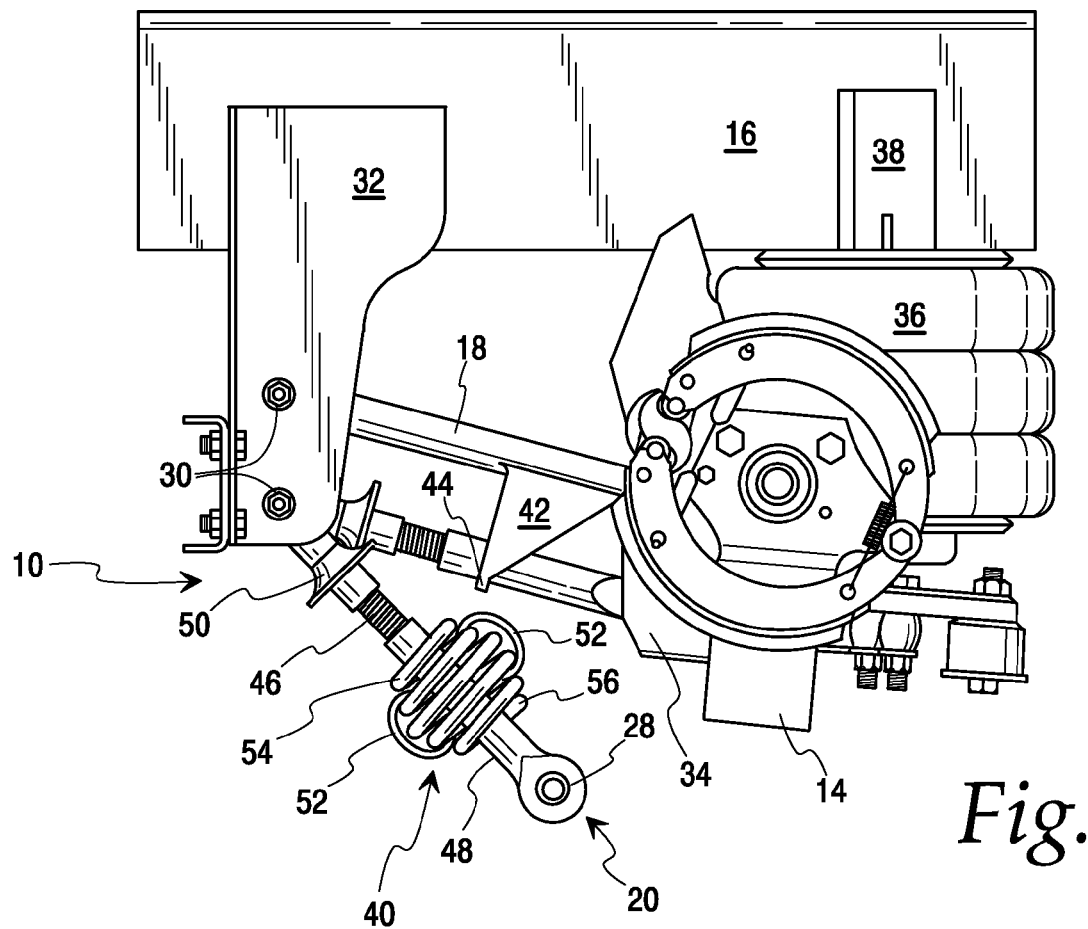
FIG. 8 is a side elevational view of the lift axle suspension system of FIG. 4, with the lift mechanism thereof in a partially installed position.

The lower control arm 20 is provided in two parts in the illustrated embodiment, as best shown in FIG. 8. The illustrated lower control arm 20 has a first portion 46, which includes the first end 24 of the control arm 20, and a second portion 48, which includes the second end 28 of the control arm 20. The first and second portion 46 and 48 may be connected by any of a number of means but, in a preferred embodiment, are threadably mated to each other. In the illustrated embodiment, at least part of the first portion 46 of the control arm 20 is substantially cylindrical, with external threads, while at least part of the second portion 48 of the control arm 20 is substantially tubular, with internal threads that match the threads of the first portion 46. Such a configuration may be advantageous in that it allows for the end-to-end length of the control arm 20 to be selected according to the degree to which the first and second portions 46 and 48 are threaded together.

Adjacent to the first end 24 of the control arm 20 (associated with the first portion 46, if the control arm 20 is provided in two pieces), a generally annular collar or flange 50 is secured to provide a contact point for the lift mechanism 40, as will be described in greater detail herein.

The lift mechanism 40 is substantially coaxial with the lower control arm 20. In the illustrated embodiment, the lift mechanism 40 is a compression coil spring which encircles at least a portion of the lower control arm 20. Encircling the lift mechanism 40 about one of the control arms may provide a safety function because, in the event that the lift mechanism 40 becomes damaged or fails, it will be retained around the control arm, rather than all or a portion of it falling to the roadway in the form of debris. An inner diameter of the lift mechanism 40 may be smaller than the ends 24 and 28 of the control arm 20, so providing the lower control arm 20 in two parts may simplify assembly of the suspension system, as the lift mechanism 40 may be slid onto and around one of the portions 46, 48 of the control arm 20 and then the two portions 46 and 48 may be connected to each other.

Figure 9:
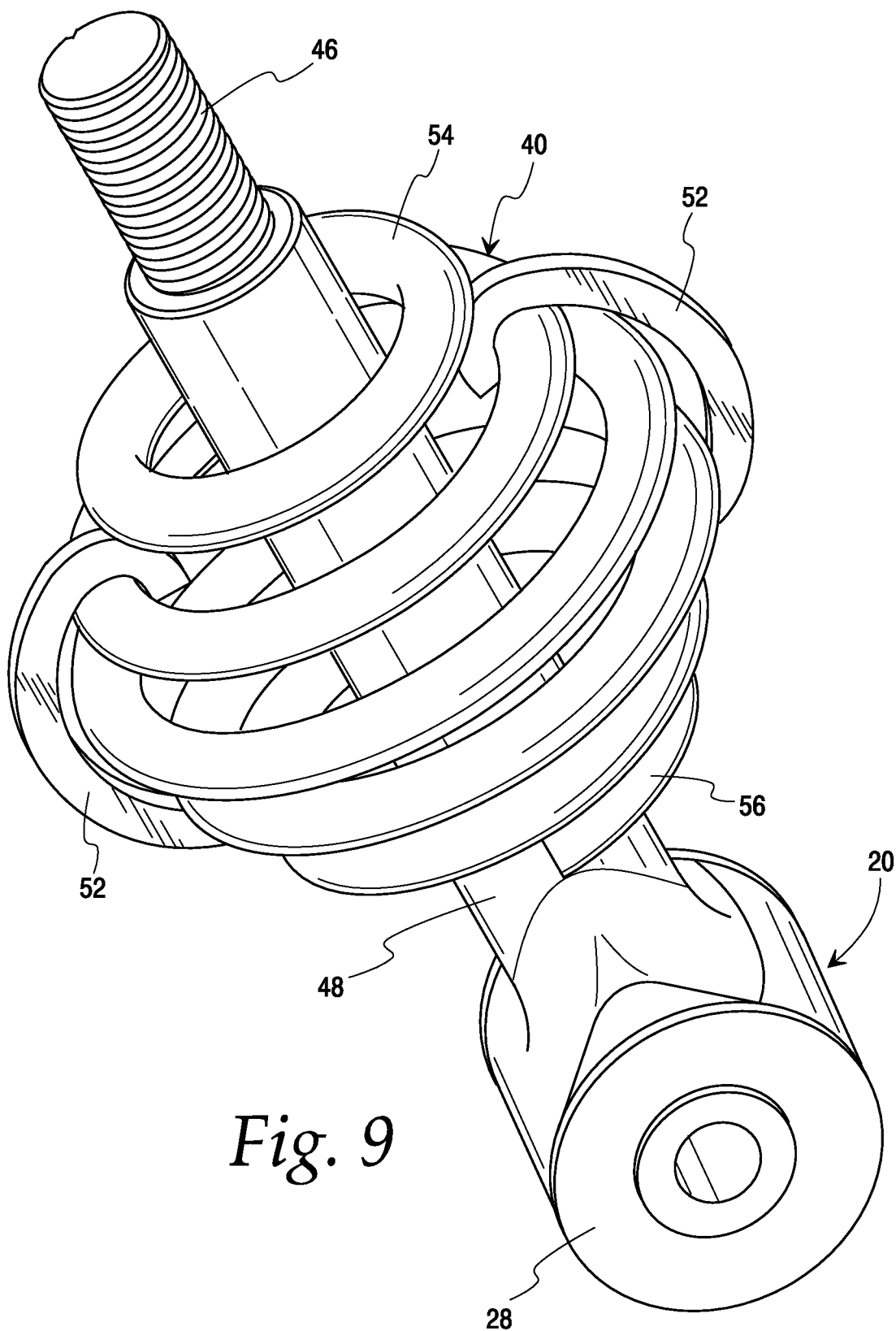
FIG. 9 is a detail view of the lift mechanism of FIG. 8.

In one embodiment, the lift mechanism 40 is provided as a compression coil spring initially in a "caged" or constrained condition, which is illustrated in FIGS. 8 and 9. A compression coil spring which is suitably strong to lift the axle 14 will typically have a great deal of stiffness, and the spring must be at least partially compressed to be properly incorporated into the lift axle suspension system 10. To avoid the need to physically compress the spring during installation, the spring may be compressed and fitted with one or more restraints 52 prior to assembly. The restraint 52 maintains the spring in an (at least partially) compressed condition, which allows the spring to be mounted to the lower control arm 20. When the spring has been properly mounted, the restraint 52 may be removed or disengaged, allowing the spring to expand into contact with the designated portions of the control arms 18 and 20, as will be described in greater detail herein. In the illustrated embodiment, a pair of C-shaped clips 52 are provided to constrain the spring. Other types of restraints, such as metal banding, may also be employed without departing from the scope of the present disclosure.

When the lift mechanism 40 has been assembled onto the lower control arm 20 (FIGS. 8 and 9), one end of the lower control arm 20 may be pivotally connected to the associated portion of the lift axle suspension system 10. For example, FIG. 8 shows the first end 24 of a fully assembled lower control arm 20 being connected to the frame bracket member 32, as described above. Alternatively, the second end 28 of the lower control arm 20 may be connected to the axle connecting member 34 (as described above) prior to connecting the first end 24 to the frame bracket member 32. Thereafter, the lower control arm 20 may be swung upwardly about its connected end to connect the other end to the associated portion of the lift axle suspension system 10. As the lower control arm 20 is being swung into place, the lift mechanism 40 is maintained generally adjacent to the flange 50 so that it will be between the flange 50 of the lower control arm 20 and the plate member 42 of the upper control arm 18 when both ends of the lower control arm 20 have been connected to the lift axle suspension system 10. Alternatively, rather than assembling the lower control arm 20 prior to connecting either end to the lift axle suspension system 10, one of the ends 24, 28 may be connected to the lift axle suspension system 10 with the lower control arm 20 in a partially assembled condition (e.g., with the lift mechanism 40 disconnected from the control arm 20). Thereafter, the lower control arm 20 may be fully assembled and swung upwardly into place to connect its other end. In either case, the forked end 44 of the plate member 42 is sized and configured to accommodate the lower control arm 20, so that the lower control arm 20 may be swung upwardly into its proper position without bearing against the upper control arm 18.

With the lower control arm 20 fully assembled and its ends 24 and 28 connected to the frame bracket member 32 and the axle connecting member 34, the ends of the lift mechanism 40 are next connected to the control arms 18 and 20. In particular, the first end 54 of the lift mechanism 40 is connected to a portion of the lower control arm 20 and its second end 56 is connected to a portion of the upper control arm 18 (FIGS. 3-7). In the illustrated embodiment, the first end 54 of the lift mechanism 40 is connected to the flange 50 of the lower control arm 20 and the second end 56 of the lift mechanism 40 is connected to the plate member 42 of the upper control arm 18. As used herein with regard to the ends 54 and 56 of the lift mechanism 40, the term "connected" is to be understood as including any variety of engagement possibilities. For example, the ends 54 and 56 of the lift mechanism 40 may be connected to the control arms 18 and 20 by fixedly securing them thereto (e.g., by welding). In another embodiment, the ends 54 and 56 of the lift mechanism 40 may be connected to the control arms 18 and 20 by removable means (e.g., by clips or clamps). In yet another embodiment, the ends 54 and 56 of the lift mechanism 40 may be connected to the control arms 18 and 20 by simply placing the ends 54 and 56 in physical contact with the control arms 18 and 20. If the lift mechanism 40 is provided as a compression coil spring, the outward force exerted by the spring when partially compressed will cause its ends 54 and 56 to naturally bear against the control arms 18 and 20 when the associated restraint 52 is removed. Further, the ends 54 and 56 of the lift mechanism 40 may be connected to the associated control arm by different means. For example, the first end 54 may be welded to the flange 50 of the lower control arm 20, while the second end 56 may simply bear against the plate member 42 of the upper control arm 18.

The separation between the points at which the ends 54 and 56 of the lift mechanism 40 are connected to the control arms 18 and 20 is less than the unstressed length of the lift mechanism 40. Therefore, the lift mechanism 40 will push the connection points away from each other as it attempts to move to its unstressed length. In the illustrated embodiment, the flange 50 is fixedly secured to the lower control arm 20, while the plate member 42 is allowed to move with respect to the lower control arm 20. Accordingly, the lift mechanism 40 will tend to move the plate member 42 away from the flange 50, along the length of the lower control arm 20, as illustrated in FIGS. 5-7. On account of the geometry of the axle lift suspension system 10, moving the plate member 42 along the length of the lower control arm 20 will cause the control arms 18 and 20 to pivot upwardly about their respective first ends 22 and 24, which lifts the axle 14.

The ride bellows 36 acts to counteract the tendency of the lift mechanism 40 to raise the axle 14. When the ride bellows 36 is inflated, the force with which it presses downwardly against the axle 14 will increase. At lower levels of inflation, the force of the ride bellows 36 is insufficient to overcome the force of the lift mechanism 40, so the axle 14 will tend to remain in the raised position of FIG. 7. As additional gas is moved into the ride bellows 36 and it expands, it will begin to overcome the force of the lift mechanism 40, moving the axle 14 away from the vehicle frame 16 (FIG. 6) and ultimately to a fully lowered position (FIG. 5).

Lift axle suspension systems according to the present disclosure are advantageous to known systems for several reasons. The lift mechanism 40 eliminates the need for a second bellows, so the air controls for the system are simplified. The lift mechanism 40 is also lighter and less expensive than a bellows and takes up less space, which allows for a more compact system. Further, in the event that the ride bellows 36 fails and deflates, the lift mechanism 40 will automatically lift the axle 14, rather than leaving it in a lowered position. Additionally, the lift mechanism 40 is more reliable and durable than a bellows. Even if it becomes desirable to replace or service the lift mechanism 40, it is easier to do so than to replace an inflatable bellows. For example, one or both ends 24, 28 of the lower control arm 20 may be disconnected from the lift axle suspension system 10 by removing the appropriate mechanical fastener(s) 30. Thereafter, the two portions 46 and 48 of the lower control arm 20 may be disconnected from each other to free the lift mechanism 40 for inspection, service, and/or replacement. When the lift mechanism 40 has been serviced or replaced, it may be remounted on the lower control arm 20, which is then reconnected to the lift axle suspension system 10, as described above.

While this invention has been described with reference to certain illustrative aspects, it will be understood that this description shall not be construed in a limiting sense. Rather, various changes and modifications can be made to the illustrative embodiments without departing from the true spirit and scope of the invention.

The invention claimed is:

1. A lift axle suspension system comprising:
    a frame bracket member connectable to a vehicle frame;
    an upper and a lower control arm, the upper control arm including a generally radially extending plate member and each control arm having a first end and a second end, wherein the first end of each control arm is pivotally connected to the frame bracket member;
    an axle connecting member connectable to an axle, wherein the second end of each control arm is pivotally connected to the axle connecting member; and
    a compression coil spring having a first end connected to the lower control arm and a second end connected to the plate member of the upper control arm, wherein
    a portion of the plate member is configured to move along the lower control arm.

2. The lift axle suspension system of claim 1, wherein the compression coil spring is substantially coaxial with one of said control arms.

3. The lift axle suspension system of claim 1, wherein the compression coil spring is substantially coaxial with the lower control arm.

4. The lift axle suspension system of claim 1, wherein the compression coil spring encircles at least a portion of one of said control arms.

5. The lift axle suspension system of claim 1, wherein the compression coil spring encircles at least a portion of the lower control arm.

6. The lift axle suspension system of claim 1, further comprising a generally annular flange member secured to the lower control arm, wherein the first end of the compression coil spring is connected to the flange member.

7. A lift axle suspension system comprising:
    a frame bracket member connectable to a vehicle frame;
    an upper and a lower control arm, each control arm having a first end and a second end, wherein the first end of each control arm is pivotally connected to the frame bracket member;
    an axle connecting member connectable to an axle, wherein the second end of each control arm is pivotally connected to the axle connecting member; and
    a lift mechanism having a first end connected to the lower control arm and a second end connected to the upper control arm, wherein the lift mechanism is substantially coaxial with one of said control arms.

8. The lift axle suspension system of claim 7, wherein the lift mechanism is substantially coaxial with the lower control arm.

9. The lift axle suspension system of claim 7, wherein the lift mechanism comprises a compression coil spring.

10. The lift axle suspension system of claim 7, wherein the lift mechanism encircles at least a portion of one of said control arms.

11. The lift axle suspension system of claim 7, wherein the lift mechanism encircles at least a portion of the lower control arm.

12. The lift axle suspension system of claim 7, wherein
    said upper control arm includes a generally radially extending plate member,
    a portion of the plate member is configured to move along the lower control arm, and
    the second end of the lift mechanism is connected to the upper control arm via the plate member.

13. The lift axle suspension system of claim 7, further comprising a generally annular flange member secured to the lower control arm, wherein the first end of the lift mechanism is connected to the flange member.

14. A lift axle suspension system comprising:
a frame bracket member connectable to a vehicle frame;
an upper and a lower control arm, each control arm having a first end and a second end, wherein the first end of each control arm is pivotally connected to the frame bracket member;
an axle connecting member connectable to an axle, wherein the second end of each control arm is pivotally connected to the axle connecting member; and
a lift mechanism having a first end connected to the lower control arm and a second end connected to the upper control arm, wherein the lift mechanism encircles at least a portion of one of said control arms.

15. The lift axle suspension system of claim 14, wherein the lift mechanism encircles at least a portion of the lower control arm.

16. The lift axle suspension system of claim 14, wherein the lift mechanism comprises a compression coil spring.

17. The lift axle suspension system of claim 14, wherein the lift mechanism is substantially coaxial with one of said control arms.

18. The lift axle suspension system of claim 14, wherein the lift mechanism is substantially coaxial with the lower control arm.

19. The lift axle suspension system of claim 14, wherein
said upper control arm includes a generally radially extending plate member,
a portion of the plate member is configured to move along the lower control arm, and
the second end of the lift mechanism is connected to the upper control arm via the plate member.

20. The lift axle suspension system of claim 14, further comprising a generally annular flange member secured to the lower control arm, wherein the first end of the lift mechanism is connected to the flange member.

* * * * *